United States Patent
Kitada et al.

(10) Patent No.: US 8,366,858 B2
(45) Date of Patent: *Feb. 5, 2013

(54) MANUFACTURING SYSTEM AND MANUFACTURING METHOD FOR OPTICAL DISPLAY DEVICE

(75) Inventors: Kazuo Kitada, Ibaraki (JP); Tomokazu Yura, Ibaraki (JP); Takuya Nakazono, Ibaraki (JP); Satoru Koshio, Ibaraki (JP)

(73) Assignee: Nitto Denko Corporation, Ibaraki-shi, Osaka (JP)

( * ) Notice: Subject to any disclaimer, the term of this patent is extended or adjusted under 35 U.S.C. 154(b) by 96 days.

This patent is subject to a terminal disclaimer.

(21) Appl. No.: 12/752,215

(22) Filed: Apr. 1, 2010

(65) Prior Publication Data

US 2010/0186890 A1    Jul. 29, 2010

Related U.S. Application Data

(62) Division of application No. 12/677,395, filed as application No. PCT/JP2008/072093 on Dec. 4, 2008, now Pat. No. 8,002,010.

(30) Foreign Application Priority Data

Dec. 27, 2007  (JP) ................................. 2007-337547
Apr. 16, 2008  (JP) ................................. 2008-107143

(51) Int. Cl.
    *B29C 65/00*   (2006.01)
    *B32B 37/02*   (2006.01)
    *B32B 37/14*   (2006.01)
    *B32B 38/00*   (2006.01)

(52) U.S. Cl. ........ 156/264; 156/521; 156/554; 156/563; 156/511; 156/64; 156/378; 156/257; 156/268

(58) Field of Classification Search .................. 156/192, 156/259, 271, 264, 199, 270, 256, 511, 521, 156/554, 563, 517, 566, 64, 378, 257, 268
    See application file for complete search history.

(56) References Cited

U.S. PATENT DOCUMENTS 1,584,450 A    5/1926   Hager
3,985,599 A    10/1976  Lepoutre et al.
(Continued)

FOREIGN PATENT DOCUMENTS

EP     1 962 258 A1    8/2008
JP     57-052017 A     3/1982
(Continued)

OTHER PUBLICATIONS

Korean Prior Art Search Report dated Dec. 9, 2010, issued in corresponding Korean Patent Application No. 10-2010-7008216.

(Continued)

*Primary Examiner* — Linda L Gray
(74) *Attorney, Agent, or Firm* — Westerman, Hattori, Daniels & Adrian, LLP

(57) ABSTRACT

Provided are a manufacturing system and a manufacturing method for an optical display device, which are enabled to adhere upper and lower optical films to an optical display device by using two rolls having optical anisotropies such as absorption axes in the same direction, so that the optical anisotropies may be orthogonal to each other. In the manufacturing system for the optical display device, the optical films are adhered to an optical display unit (W). The manufacturing system comprises a feeding device (M2) for a first optical film (F11) to be fed after cut to a predetermined length, and a feeding device (M5) for a second optical film (F21) to be fed after cut to a predetermined length. The feeding device (M2) of the first optical film (F11) and the feeding device (M5) of the second optical system (F21) are so constituted in a manner to correspond to the longer side and the shorter side of the optical display unit (W), that one feeding device may cut the optical film having a width corresponding to the shorter side may be cut to a length corresponding to the longer side whereas the other feeding device may cut the optical film having a width corresponding to the longer side may be cut to a length corresponding to the shorter side.

5 Claims, 7 Drawing Sheets

U.S. PATENT DOCUMENTS

| | | | |
|---|---|---|---|
| 5,245,456 | A | 9/1993 | Yoshimi et al. |
| 5,667,624 | A | 9/1997 | Akimoto et al. |
| 6,848,488 | B2 | 2/2005 | Choo et al. |
| 7,022,204 | B2 | 4/2006 | Kanbara et al. |
| 8,002,010 | B2 * | 8/2011 | Kitada et al. ............... 156/511 |
| 2004/0095526 | A1 | 5/2004 | Yamabuchi et al. |
| 2004/0169809 | A1 | 9/2004 | Yamabuchi et al. |
| 2005/0016670 | A1 | 1/2005 | Kanbara et al. |
| 2006/0062934 | A1 | 3/2006 | Hayashi et al. |
| 2006/0124248 | A1 | 6/2006 | Kanbara et al. |
| 2007/0013858 | A1 | 1/2007 | Yamabuchi et al. |
| 2007/0200976 | A1 | 8/2007 | Kawamoto et al. |
| 2008/0303639 | A1 * | 12/2008 | Ford et al. ............... 340/10.51 |
| 2009/0159175 | A1 | 6/2009 | Nakahira et al. |
| 2009/0218049 | A1 | 9/2009 | Kanbara et al. |

FOREIGN PATENT DOCUMENTS

| | | |
|---|---|---|
| JP | 62-14810 B2 | 4/1987 |
| JP | 08-087007 A | 4/1996 |
| JP | 11-231129 A | 8/1999 |
| JP | 2003-161935 A | 6/2003 |
| JP | 2004-144908 A | 5/2004 |
| JP | 2004-250213 A | 9/2004 |
| JP | 2004-262071 A | 9/2004 |
| JP | 2005-37417 A | 2/2005 |
| JP | 2007-140046 A | 6/2007 |
| JP | 2009-122641 A | 6/2009 |
| TW | 520452 B | 2/2003 |
| TW | I274914 B | 3/2007 |
| WO | 2007/058023 A1 | 5/2007 |

OTHER PUBLICATIONS

USPTO Office Action dated Jan. 6, 2011, issued in U.S. Appl. No. 12/770,371.
Korean Office Action mailed on Jan. 11, 2011, issued in corresponding Korean Patent Application No. 10-2010-7008216.
USPTO Office Action dated Mar. 4, 2011, issued in U.S. Appl. No. 12/770,305.
International Search Report of PCT/JP2008/072093, mailing date of Jan. 13, 2009.
USPTO Office Action dated May 2, 2011, issued in U.S. Appl. No. 12/423,379.
USPTO Office Action (Notice of Allowance) dated May 9, 2011, issued in U.S. Appl. No. 12/770,419.
Notification of Transmittal of Translation of the International Preliminary Report on Patentability (Form PCT/IB/338) of International Application No. PCT/JP2008/072093 mailed Jul. 29, 2010 with forms PCT/IB/373 and PCT/ISA/237.
USPTO Office Action dated Aug. 19, 2011, issued in U.S. Appl. No. 12/855,420.
USPTO Office Action (Notice of Allowance) dated Aug. 30, 2011, issued in U.S. Appl. No. 12/423,379.
Taiwanese Search Report dated Dec. 24, 2008, issued in corresponding Taiwanese Patent Application No. 097150491.
European Search Report dated Aug. 31, 2011, issued in corresponding European Patent Application No. 10159514.8.
European Search Report dated Aug. 31, 2011, issued in corresponding European Patent Application No. 08868127.5.
European Search Report dated Aug. 31, 2011, issued in corresponding European Patent Application No. 10162700.8.
Japanese Office Action dated Aug. 5, 2009, issued in corresponding Japanese Patent Application No. 2009-090269.
Taiwanese Search Report dated Apr. 2, 2009, issued in corresponding Taiwanese Patent Application No. 098112545.
USPTO Office Action dated Sep. 10, 2010, issued in U.S. Appl. No. 12/423,379.
USPTO Office Action dated Sep. 16, 2010, issued in U.S. Appl. No. 12/770,371.
USPTO Office Action dated Dec. 10, 2010, issued in U.S. Appl. No. 12/677,395.
USPTO Office Action dated Dec. 27, 2010, issued in U.S. Appl. No. 12/423,379.
Chinese Office Action dated Feb. 13, 2012, issued in corresponding Chinese Patent Application No. 201010227614.5 (with partial translation).
Chinese Office Action dated Aug. 15, 2012, issued in corresponding Chinese Patent Application No. 201010227614.5, with partial English translation (10 pages).

* cited by examiner

MANUFACTURING SYSTEM AND MANUFACTURING METHOD FOR OPTICAL DISPLAY DEVICE

CROSS-REFERENCE

This is a divisional of U.S. application Ser. No. 12/677,395, filed on Mar. 10, 2010, which is a National Stage of PCT/JP2008/072093, filed on Dec. 4, 2008, which claims priority from Japanese Patent Application No. 2007-337547, filed Dec. 27, 2007 and Japanese Patent Application No. 2008-107143, filed on Apr. 16, 2008.

BACKGROUND OF THE INVENTION

1. Field of the Invention

The present invention relates to a manufacturing system and a manufacturing method for an optical display device for bonding an optical film having the optical anisotropy such as an optical film including a polarizing plate to upper and lower sides of an optical display unit.

2. Description of the Related Art

A production method of an optical display device mounted to a conventional liquid crystal display device is conceptually shown in FIG. 9. First, in an optical filmmaker, a step produces a long (web-like) sheet material having an optical film as a material roll (#1). The concrete production step is a known production step, and a description thereof will not be given. As the "long (web-like) sheet material", for example, there are a polarizing plate material, a retardation plate material, a laminated film material of the polarizing plate and the retardation plate, and the like which are used in a liquid crystal display device. Next, the material roll is slit to a predetermined size (a size in accordance with a size of the optical display unit) (#2). Next, the slit long material is cut to a fixed size in conformity to a size of the optical display unit (#3). Next, a step inspects an outer appearance of a piece of sheet material (an optical film) cut to the fixed size (#4). As the inspecting method, for example, there can be listed up a defect inspection in accordance with a visual observation, and an inspection using a known defect inspection apparatus. The defect means, for example, a dirty in a front face or an internal portion, a scratch, a special twisted defect like a hitting mark generated by biting a contaminant (which may be called as a knick), an air bubble, a contaminant or the like. Next, a step inspects a finished product (#5). The finished product inspection is an inspection in accordance with a quality standard having a severer non-defective determination than the outer appearance inspection. Next, a step works end faces in four sides of the sheet material of the piece of sheet material (#6). This step is carried out for preventing an adhesive or the like from running over from the end faces during transport. Next, a step cleanly packages the piece of sheet material under a clean room environment (#7). Next, a step packages for transport (a transport package) (#8). The piece of sheet material is produced as mentioned above, and is transported to a panel processing manufacturer.

In the panel processing manufacturer, a step dismounts the package of the piece of sheet material transported (#11). Next, a step inspects an outer appearance for inspecting the scratch, the dirt and the like generated at a time of transporting or dismounting the package (#12). The piece of sheet material which is determined as the non-defective by the inspection is fed to the next step. There is a case that the outer appearance inspection is omitted. An optical display unit (for example, a glass substrate unit in which a liquid crystal cell is enclosed) to which the piece of sheet material is bonded is previously produced, and the optical display unit is cleaned before the bonding step (#13).

A step bonds the piece of sheet material and the optical display unit (#14). A release film is peeled off from the piece of sheet material while leaving a pressure-sensitive adhesive layer, and it is bonded to one face of the optical display unit by using the pressure-sensitive adhesive layer as a bonding face. Further, it can be bonded to the other face of the optical display unit in the same manner. In the case of bonding to both the faces, the structure may be made such that the optical films having the same construction are bonded to the faces of the optical display unit, or the structure may be made such that the optical films having different constructions are bonded thereto. Next, a step carries out an inspection of the optical display device in the state in which the optical film is bonded and a defect inspection (#15). The optical display device which is determined as the non-defective in this inspection is fed to a mounting process (#16). On the other hand, a reworking process is applied to the optical display device which is determined as a defective (#17). In the reworking process, the optical film is peeled off from the optical display unit. The optical film is newly bonded to the reworked optical display unit (#14).

In the production step mentioned above, since the optical film maker and the panel processing manufacturer exist in the separate places, the end face working, the packaging of the piece of sheet material, the package dismounting and the like are particularly necessary steps. However, there are a problem of a production cost increase caused by multiple steps, a problem of the scratch, the dust, the dirt and the like generated by the multiple steps and the transport, a necessity of the inspection step caused thereby, and a problem that it is necessary to store and manage many kinds of sheet materials as a stock.

As a method for solving this, the applicant of the present invention has created the invention described in Japanese Unexamined Patent Publication No. 2007-140046 (patent document 1). In accordance with this invention, the structure is provided with a supply portion pulling out and supplying a long sheet material from a material roll around which the long sheet material having an optical film corresponding to a member of an optical display device is wound, a detection portion detecting a defect of the long sheet material pulled out by the supply portion, a cutting work portion cutting the long sheet material based on a result of detection of the detection portion and working to an individual sheet material, a transfer portion transferring the sheet material cut by the cutting work portion for a bonding work, and a bonding work portion bonding the sheet material transferred by the transfer portion and an optical display unit corresponding to a member of an optical display device, and these portion are arranged on a continuous production line. In the structure mentioned above, it is possible to directly cut the long sheet material having the optical film into a desired size, and to bond the cut sheet material to the optical display unit. Accordingly, it is possible to directly package the long sheet material wound around the material roll so as to deliver, in place of the conventional step which stamps the long sheet material, tightly packages the stamped sheet material, and delivers to the panel processing manufacturer.

Patent Literature 1: JP-A No. 2007-140046

SUMMARY OF THE INVENTION

However, in the manufacturing system for the optical display device in the patent document 1, there is not disclosed a structure which is independently provided with an apparatus at a time of bonding the optical film to the surface of one side of the optical display unit and thereafter bonding the optical film to the surface of the other side thereof. Accordingly, in the case of bonding the optical film to the surface of the other side by using the same manufacturing system, there is room for improvement of a manufacturing efficiency such as a double labor work at a time of loading the optical display unit after being bonded to the device.

Further, in the polarizing plate bonded to the upper and lower sides of the optical display unit, the directions of the absorption axes are different in upper and lower sides (intersect vertically), and it is generally hard to manufacture the material roll having the absorption axis in the roll width direction. On the other hand, the normal optical display unit has a rectangular shape. Taking these into consideration, the device structure is not said to be sufficient only by adding each of the means from the feeding means to the bonding process means of the long sheet material to the manufacturing system of the patent document 1.

Further, not limiting to the case that the polarizing plates are laminated up and down, for example, in the case that the retardation plates are laminated above and below the optical display unit, there is a case that it is necessary to make the directions of the lagging axis orthogonal in each of the upper and lower sides, and the same problem as the case of laminating the polarizing plates is generated also in this case.

Accordingly, an object of the present invention is to provide a manufacturing system and a manufacturing method for an optical display device which can bond upper and lower optical films to an optical display unit in such a manner that optical anisotropies are orthogonal, by using two rolls having the same optical anisotropy such as absorption axes or the like.

The object mentioned above can be achieved by the present invention as described below.

A manufacturing system for the optical display device according to the present invention relates to a manufacturing system for an optical display device obtained by bonding an optical film having the optical anisotropy to an optical display unit, comprising:

a first cutting and bonding apparatus cutting a first optical film at a length corresponding to a long side of said optical display unit and thereafter bonding to one surface of the optical display unit, by using a roll around which a long sheet material having the first optical film having a width corresponding to a short side of said optical display unit is taken up; and a second cutting and bonding apparatus cutting a second optical film at a length corresponding to a short side of said optical display unit and thereafter bonding to the other surface of the optical display unit, by using a roll around which a long sheet material having the second optical film having a width corresponding to a long side of said optical display unit is taken up.

In accordance with the manufacturing system for the optical display device of the present invention, it is possible to obtain each of the optical films corresponding to the short side and the long side of the optical display unit only by cutting the respectively fed optical films at the fixed interval, by using the roll having the width corresponding to the short side of the optical display unit and the roll having the width corresponding to the long side. Accordingly, it is possible to bond the upper and lower optical films to the optical display unit in such a manner that the optical anisotropies are orthogonal, while using two rolls in which the optical anisotropies are the same direction such as the absorption axes or the like, by cutting the former at the length corresponding to the long side, cutting the latter at the length corresponding to the short side, and bonding them to both the surfaces of the optical display unit.

A manufacturing system for the optical display device according to the present invention relates to a manufacturing system for an optical display device obtained by bonding an optical film including a polarizing plate to an optical display unit, comprising:

a feeder of the optical display unit feeding the optical display unit:

a feeder of a first optical film drawing out a long sheet material from a roll around which the long sheet material having a first optical film is taken up, and feeding after cutting at a predetermined length;

a first bonding apparatus bonding the first optical film fed from the feeder of said first optical film to one surface of the optical display unit fed from the feeder of said optical display unit;

a feeder feeding the optical display unit after the first optical film is bonded thereto;

a feeder of a second optical film drawing out a long sheet material from a roll around which the long sheet material having a second optical film is taken up, and feeding after cutting at a predetermined length; and a second bonding apparatus bonding the second optical film fed from the feeder of said second optical film to the other surface of the optical display unit fed from said feeder, wherein the feeder of said first optical film and the feeder of said second optical film are structured such that one feeder cuts the optical film having the width corresponding to a short side of said optical display unit at a length corresponding to a long side thereof, and the other feeder cuts the optical film having the width corresponding to the long side at a length corresponding to the short side, in correspondence to the long side and the short side of said optical display unit.

In accordance with the manufacturing system for the optical display device of the present invention, as well as being further provided with the feeder, the feeder of the second optical film and the second bonding apparatus as mentioned above, the feeder of the first optical film and the feeder of the second optical film are structured such that the optical films can be fed while changing the widths and the cutting lengths in correspondence to the long side and the short side of the optical display unit respectively. Accordingly, it is possible to bond the upper and lower optical films to the optical display unit on the continuous manufacturing line by using the material rolls in which the absorption axes of the polarizing plates are the same direction.

In the structure mentioned above, it is preferable that the feeder has a turning mechanism turning the optical display unit after being bonded by the first bonding apparatus in the bonding direction in the second bonding apparatus. It is not necessary to arrange the feeder of the first optical film to the first bonding apparatus, and the feeder of the second optical film to the second bonding apparatus vertically, by having the turning mechanism as mentioned above, and it is possible to achieve a space saving of the manufacturing system. Further, it is possible to make the bonding angle in the second bonding apparatus appropriate by the turning mechanism. In other words, it is possible to enhance the positional precision of the turning by turning the harder optical display unit rather than by turning the high flexible structure such as the optical film.

It is preferable that the feeder of said first optical film and the feeder of said second optical film have a rejection mechanism of a defect portion cutting and rejecting a portion having a defect in the optical film. On the basis of the provision of the rejecting mechanism, it is possible to reject the defect portion of the optical film, and it is possible to improve a yield ratio of the optical display unit after being bonded.

It is preferable that the feeder of said first optical film and the feeder of said second optical film have feeder mechanisms feeding the first optical film to the first bonding apparatus and the second optical film to the second bonding apparatus by using a release film formed in the optical film via a pressure-sensitive adhesive layer as a carrying medium. On the basis of the provision of the feeder mechanism, it is possible to feed the first optical film to the first bonding apparatus and the second optical film to the second bonding apparatus precisely by using the simple feeder mechanism.

A manufacturing method for the optical display device according to the present invention relates to a manufacturing method for an optical display device obtained by bonding an optical film having the optical anisotropy to an optical display unit, comprising:

a first cutting and bonding step of cutting a first optical film at a length corresponding to a long side of said optical display unit and thereafter bonding to one surface of the optical display unit, by using a roll around which a long sheet material having the first optical film having a width corresponding to a short side of said optical display unit is taken up; and a second cutting and bonding step of cutting a second optical film at a length corresponding to a short side of said optical display unit and thereafter bonding to the other surface of the optical display unit, by using a roll around which a long sheet material having the second optical film having a width corresponding to a long side of said optical display unit is taken up.

In accordance with the manufacturing method for the optical display device of the present invention, the method uses the roll having the width corresponding to the short side of the optical display unit, and the roll having the width corresponding to the long side, cuts the former at the length corresponding to the long side, cuts the latter at the length corresponding to the short side, and bonds them to both the surfaces of the optical display unit. Accordingly, it is possible to bond the upper and lower optical films to the optical display unit in such a manner that the optical anisotropies are orthogonal, by using two rolls in which the optical anisotropies are the same direction, such as the absorption axis or the like.

A manufacturing method for the optical display device according to the present invention relates to a manufacturing method for an optical display device obtained by bonding an optical film including a polarizing plate to an optical display unit, comprising:

a first cutting and bonding step of drawing out a long sheet material from a roll around which the long sheet material having a first optical film is taken up so as to cut at a predetermined length, and thereafter bonding the first optical film to one surface of said optical display unit while feeding;

a second cutting and bonding step of drawing out a long sheet material from a roll around which the long sheet material having a second optical film is taken up so as to cut at a predetermined length, and thereafter bonding the second optical film to the other surface of said optical display unit while feeding;

wherein the method comprises a step of cutting the optical film having the width corresponding to a short side of said optical display unit at a length corresponding to a long side thereof at a time of feeding one of said first optical film and said second optical film, and cutting the optical film having the width corresponding to the long side at a length corresponding to the short side at a time of feeding the other of them, in correspondence to the long side and the short side of said optical display unit, at a time of feeding said first optical film and said second optical film.

In accordance with the manufacturing method for the optical display device of the present invention, since the method includes the step cutting in correspondence to the long side and the short side of the optical display unit at a time of feeding the first optical film and the second optical film, cutting the optical film having the width corresponding to the short side at the length corresponding to the long side at a time of feeding one of them, and cutting the optical film having the width corresponding to the long side at the length corresponding to the short side at a time of feeding the other, it is possible to bond the upper and lower optical films to the optical display unit on the continuous manufacturing line, by using the material rolls in which the absorption axes of the polarizing plate are the same direction.

It is preferable that the manufacturing method further comprises a turning step of turning the optical display unit after being bonded by said first cutting and bonding step in a bonding direction in said second cutting and bonding step. In accordance with the turning step mentioned above, it is not necessary to arrange the feeding direction of the first optical film and the feeding direction of the second optical film vertically, and it is possible to achieve a space saving of the manufacturing system. Further, it is possible to make the bonding angle in the second cutting and bonding step appropriate, by utilizing the turning step.

It is preferable that the manufacturing method further comprises a rejection step of a defect portion for cutting and rejecting a portion having a defect in the optical film, at a time of feeding said first optical film and said second optical film. In accordance with the rejecting step mentioned above, it is possible to reject the defect portion of the optical film, and it is possible to improve a yield ratio of the optical display unit after being bonded.

It is preferable that the method feeds the first optical film to the first cutting and bonding step and the second optical film to the second cutting and bonding step by using a release film formed in the optical film via a pressure-sensitive adhesive layer as a carrying medium, at a time of feeding said first optical film and said second optical film. In accordance with the feeding method mentioned above, it is possible to feed the first optical film to the first cutting and bonding step and the second optical film to the second cutting and bonding step precisely by using a simple feeding mechanism.

DETAILED DESCRIPTION OF THE PREFERRED EMBODIMENTS

Figure 1:
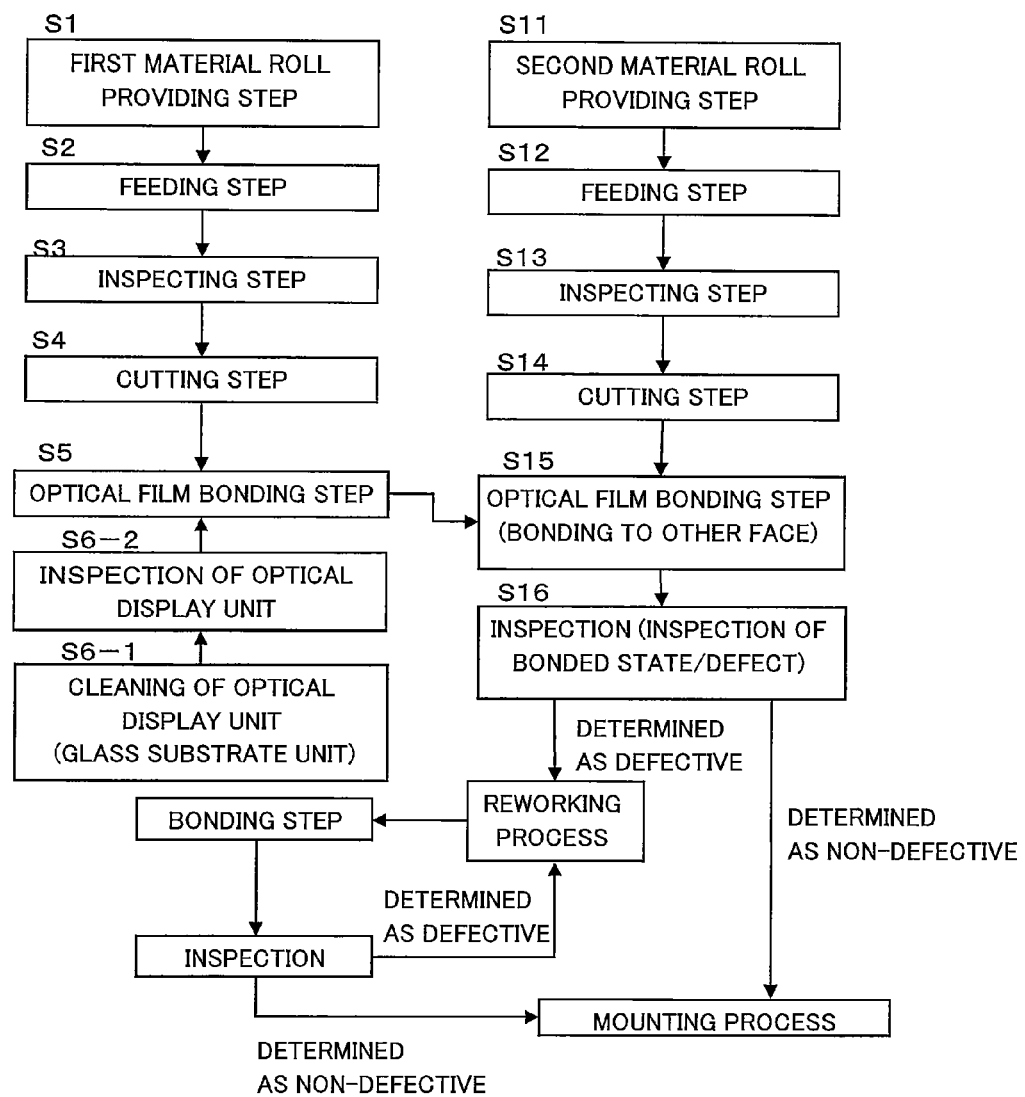
FIG. 1 is a flow chart showing steps by a manufacturing system in accordance with the present invention.
Figure 2:
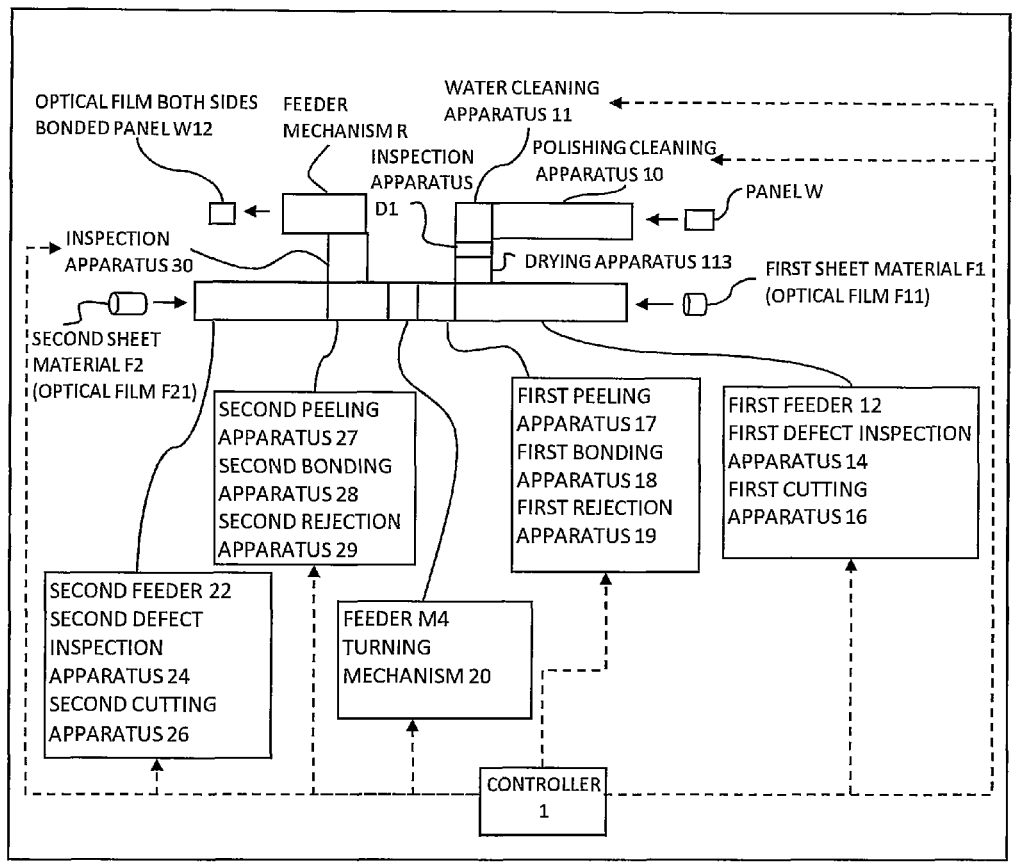
FIG. 2 is a view for explaining an embodiment of the manufacturing system in accordance with the present invention.
Figure 3:
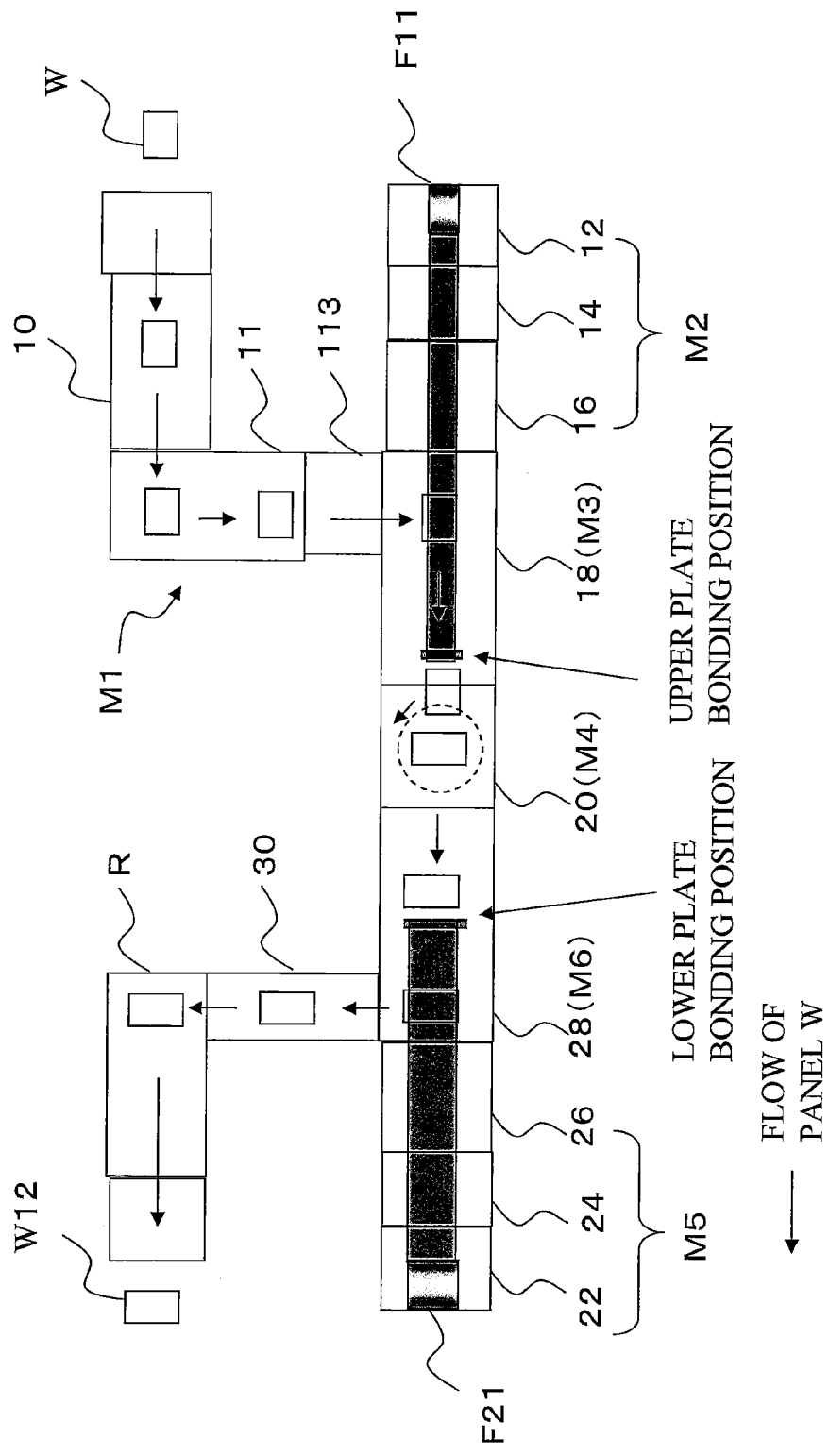
FIG. 3 is a view for explaining an embodiment of the manufacturing system in accordance with the present invention.

A description will be given below of an embodiment in accordance with the present invention in the order of a raw material used in a manufacturing system for an optical display device, a flow of a manufacturing step, ands structure of each of portions of the manufacturing system. FIG. 1 shows an example of a flow chart of a manufacturing method for the optical display device. FIG. 2 shows a block diagram of an embodiment of a manufacturing system for the optical display device. FIG. 3 shows a plan arrangement view of an embodiment of a manufacturing system for the optical display device.

(Optical Display Unit)

First, for example, a glass substrate unit of a liquid crystal cell, an organic electroluminescent (EL) light-emitting unit and the like can be listed up, as an optical display unit used in the present invention. The present invention is effective for an optical display unit having a rectangular outer shape, for example, a structure in which long side/short side is 16/9, or a structure in which it is 4/3 is used. In this case, the optical display unit may employ one in which members such as an optical film and the like are laminated and integrated.

(Optical Film)

As the optical film bonded to the optical display unit, it is sufficient to have the optical anisotropy, for example, there can be listed up a polarizing plate, a polarizing reflection plate, a retardation film, a brightness enhancement film, an optical film obtained by two or more of them, and the like.

Above all, the optical film including the polarizing plate is preferable. As the optical film including the polarizing plate, there can be exemplified the polarizing plate, the optical film obtained by laminating the retardation film, the brightness enhancement film or a combination of two or more of these films on the polarizing plate, or the like.

There is a case that a transparent film for protection is laminated on a surface of the optical film. Further, it is preferable that an adhesive layer is formed on one surface of the optical film, for example, in such a manner as to be bonded to the optical display unit, and a release film for protecting the adhesive layer is provided. Further, a surface protecting film is provided on the other surface of the optical film, for example, via a pressure-sensitive adhesive layer.

The present invention is effective in the case of using two material rolls in which the optical anisotropies are the same direction, and is particularly effective in the case of using two material rolls in which absorption axes of the polarizing plates constructing the optical film are the same direction. A direction of the absorption axis of the polarizing plate generally comes to a long direction of the material roll. Further, in the case of the retardation film, there are cases that a lagging axis coincides with the long direction of the material roll, is vertical, comes to a diagonal direction at a fixed angle, and the like. In the following description, there may be a case that the optical film in which the surface protecting film and the release film are laminated is called as a sheet material.

(Manufacturing Flow Chart)

A manufacturing method for the optical display device in accordance with the present invention is a manufacturing method for an optical display device obtained by bonding an optical film having the optical anisotropy to an optical display unit, and is preferably a manufacturing method for an optical display device obtained by bonding an optical film including a polarizing plate to an optical display unit.

The manufacturing method in accordance with the present invention is structured such as to include a first cutting and bonding step and a second cutting and bonding step, however, any step may be carried out in advance, and both the steps may be carried out simultaneously or approximately simultaneously.

The first cutting and bonding step is structured such as to cut at a length corresponding to a long side of the optical display unit by using a roll around which a long sheet material having a first optical film with a width corresponding to a short side of the optical display unit is taken up, and thereafter bonding the first optical film to one surface of the optical display unit.

The second cutting and bonding step is structured such as to cut at a length corresponding to a short side of the optical display unit by using a roll around which a long sheet material having a second optical film with a width corresponding to a long side of the optical display unit is taken up, and thereafter bonding the second optical film to the other surface of the optical display unit.

The manufacturing method for the optical display device in accordance with the present invention more particularly includes, for example, a first cutting and bonding step of drawing out the long sheet material from the roll around which the long sheet material having the first optical film is taken up so as to cut at a predetermined length, and thereafter bonding the first optical film to the one surface of the optical display unit while feeding, and a second cutting and bonding step of drawing out the long sheet material from the roll around which the long sheet material having the second optical film is taken up so as to cut at a predetermined length, and thereafter bonding the second optical film to the other surface of the optical display unit while feeding.

The first cutting and bonding step is executed, for example, by (2) a feeding step to (5) a first optical film bonding step which are mentioned below, and the second cutting and bonding step is executed, for example, by (8) a feeding step to (11) a second optical film bonding step which are mentioned below.

(1) First Material Roll Providing Step (S1 in FIG. 1). A long first sheet material is provided as a first material roll. A width of the first material roll depends on a bonding size of the optical display unit. Specifically, the width of the first material roll is decided in correspondence to one of the long side and the short side of the optical display unit, and the width of the second material roll is decided in correspondence to the other. Accordingly, the first material roll and the second material roll have the different widths, and there is used a material which is previously slit at a predetermined width in accordance with a slitting process from the material roll before slitting.

The slitting process is carried out while rewinding the material roll before slitting, and as a method thereof, there can be listed up a method of using a laser cutting apparatus, or a cutting tool such as a rotating round tooth or the like. In this case, it is possible to use a method of cutting one end surface or both end surfaces of the roll end surface without rewinding the material roll before slitting.

In the present invention, the description "in correspondence to the long side or the short side of the optical display unit" indicates a length (a length except an exposed portion) of the bonding of the optical film corresponding to the length of the long side or the short side of the optical display unit, and it is not necessary that the length of the long side or the short side of the optical display unit is the same as the width of the optical film.

Figure 8:
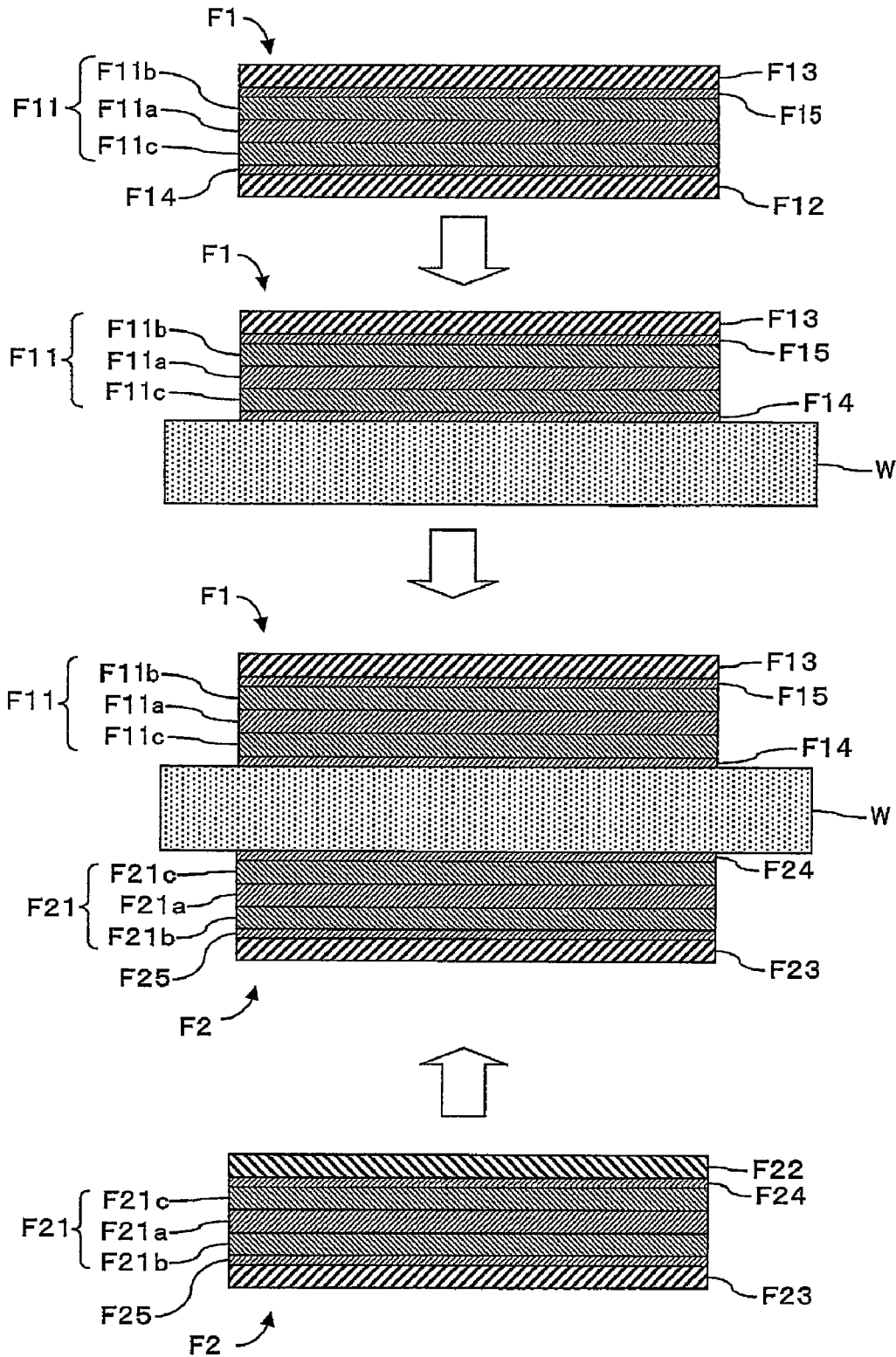
FIG. 8 is a view for explaining an embodiment of a laminating structure of first and second optical films.
Figure 9:
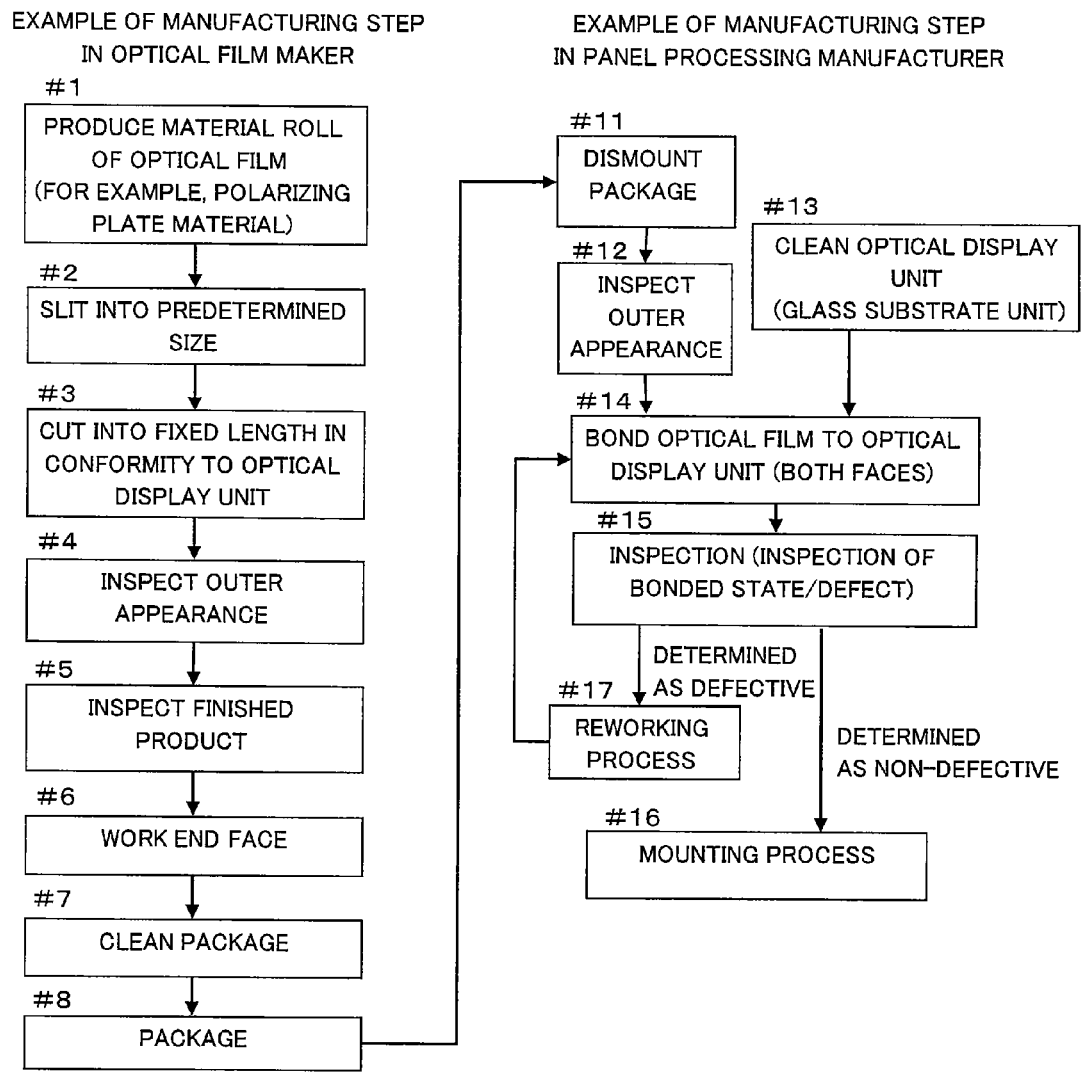
FIG. 9 is a flow chart of a manufacturing method of a conventional optical display unit.

As shown in FIG. 8, for example, a lamination structure of a first sheet material F1 has a first optical film F11, a first release film F12 and a surface protecting film F13. The first optical film F11 is configured by a first polarizer F11a, a first film F11b provided on one face via an adhesive layer (not shown), and a second film F11c provided on the other face via the adhesive layer (not shown).

The first and second films F11b and F11c are configured, for example, by a polarizer protecting film (for example, a tri-acetyl cellulose film, a PET film or the like). The second film F11c is bonded to the optical display unit face side via a first pressure-sensitive adhesive layer F14. A surface treatment can be applied to the first film F11b. As the surface treatment, for example, there can be listed up a hard coating, an anti-reflection treatment, a treatment aiming at a prevention of a sticking, a diffusion and an anti-glare, and the like. The first release film F12 is provided via the second film F11c and the first pressure-sensitive adhesive layer F14. Further, the surface protecting film F13 is provided via the first film F11b and the pressure-sensitive adhesive layer F15. Specific structures of the first and second films F11b and F11c are described later. In the following description, there is a case that the laminated structure of the polarizer and the polarizer protecting film is called as the polarizing plate.

It is preferable that each of the following steps is carried out within an isolating construction which is isolated in a factory, and a cleanliness factor is maintained. It is particularly preferable that the cleanliness factor is maintained in a bonding step bonding the optical film to the optical display unit.

(2) Feeding Step (S2 in FIG. 1). The first sheet material F1 is unwound from the provided and placed first material roll, and is fed to a downstream side. The first feeder 12 feeding the first sheet material F1 is constructed, for example, by a pair of nip rollers, a tension roller, a rotary drive, an accumulator A, a sensor, a controller and the like.

(3) First Inspection Step (S3 in FIG. 1). A defect of the first sheet material F1 is inspected by using a first defect inspection apparatus 14. As a defect inspection method in this case, there can be listed up a method of performing imaging and image processing generated by a transmitted light and a reflected light with respect to both faces of the first sheet material F1, a method of performing imaging and image processing by arranging a polarization film for inspection between a CCD camera and a subject to be inspected, in such a manner as to form crossed nicols relation (which may be called as 0 degree cross) to a polarization axis of the polarization plate corresponding to the subject to be inspected, and a method of performing imaging and image processing by arranging a polarization film for inspection between a CCD camera and a subject to be inspected, in such a manner as to form a predetermined angle (for example, in a range larger than 0 degree and less than 10 degree) (which may be called as x degree cross) to a polarization axis of the polarization plate corresponding to the subject to be inspected. In this case, a known method can be applied to an algorithm of the image processing, for example, the defect can be detected by grayscale determination in accordance with a binarization processing.

In the performing imaging and image processing method by the transmitted light, it is possible to detect a contaminant in an inner portion of the first sheet material F1. In the performing imaging and image processing method by the reflected light, it is possible to detect a contaminant attached to the front face of the first sheet material F1. In the performing imaging and image processing method by the 0 degree cross, it is possible to mainly detect a contaminant on the front face, a dirty, a contaminant in an inner portion and the like as a bright spot. In the performing imaging and image processing method by the x degree cross, it is possible to mainly detect a knick.

The information of the defect obtained by the first defect inspection apparatus 14 is associated with its positional information (for example, a position coordinate), is transmitted to a controller 1, and can contribute to a cutting method by a first cutting apparatus 16 mentioned below.

(4) First Cutting Step (S4 in FIG. 1). The first cutting apparatus 16 cuts the surface protection film F13, the pressure-sensitive adhesive layer F15, the first optical film F11 and the first pressure-sensitive adhesive layer F14 to a predetermined size without cutting the first release film F12. As a result, the first release film F12 can be used as a carrying medium of the first optical film F11. In other words, in the present invention, it is preferable to feeding the first optical film F11 to the first cutting and bonding step and the second optical film F21 to the second cutting and bonding step, while using the release film formed in the optical film via the pressure-sensitive adhesive layer as the carrying medium.

With regard to the cutting length, for example, in correspondence to one of the long side and the short side of the optical display unit, in the case that the width of the first material roll corresponds to the short side, the optical film is cut at the length corresponding to the long side, or in the case that the width of the first material roll corresponds to the long side, the optical film is cut at the length corresponding to the short side. In the present embodiment, as shown in FIG. 3, there is shown an example in the case that the width of the first material roll (the first sheet material F1) corresponds to the short side of the optical display unit W.

As the cutting portion, for example, there can be listed up a laser, a cutter, and the other known cutting portion. The structure is made such as to cut so as to avoid the defect, based on the information of the defect obtained by the first defect inspection apparatus 14. Accordingly, a yield ratio of the first sheet material F1 is widely improved. The first sheet material F1 including the defect is excluded by a first rejection apparatus 19 mentioned below, and is structured such as not to be attached to an optical display unit W. In other words, in the present invention, it is preferable to include a rejection step of a defect portion for cutting and rejecting a portion having a defect of the optical film at a time of feeding the first optical film F11 and the second optical film F21.

(5) First Optical Film Bonding Step (S5 in FIG. 1). The first optical film F11 from which the first release film F12 is removed is bonded to the optical display unit W via the first pressure-sensitive adhesive layer F14 by using a first bonding apparatus 18 while removing the first release film F12 by using the first peeling apparatus 17. At a time of the bonding, the first optical film F11 and the optical display unit W are pinched by roll pairs (181, 182) so as to be crimped, as mentioned below.

(6-1) Cleaning Step (S6-1 in FIG. 1). The optical display unit W (the panel W in FIG. 2) is cleaned its surface by a polishing cleaning apparatus 10 and a water cleaning apparatus 11, as shown in FIG. 2. The cleaned panel W is fed to an inspection apparatus D1 by a feeder mechanism R. The feeder mechanism R is constructed, for example, by a feeder roller, a feeding direction switching mechanism, a rotary drive, a sensor, a controller and the like. The polishing cleaning apparatus 10 and the water cleaning apparatus 11 will be described later.

(6-2) Inspection Step (S6-2 in FIG. 1). The optical display unit W after being cleaned is inspected its surface by the inspection apparatus D1, as shown in FIG. 2. The panel W after being inspected is fed to the first bonding apparatus 18 by the feeder mechanism R. The inspection apparatus D1 will be described later.

It is preferable that the first material roll providing step, the first inspecting step, the first cutting step, the first optical film bonding step, the cleaning step and the inspection step are set to a continuous production line. The first optical film F11 is bonded to one face of the panel W through a series of production steps mentioned above. In the following description, a description will be given below of a production steps bonding the second optical film F21 to the other face.

(7) Second Material Roll Providing Step (S11 in FIG. 1). The long second sheet material F2 is provided as the second material roll. As shown in FIG. 8, a laminated structure of the second sheet material F2 is the same structure as the first sheet material, however, is not limited to this. The second sheet material F2 has the second optical film F21, a second release film F22, and a surface protecting film F23. The second optical film F21 is configured by a second polarizer 21a, a third film F21b provided on one face thereof via an adhesive layer (not shown), and a fourth film F21c provided on the other face thereof via an adhesive layer (not shown).

The third and fourth films F21b and F21c are configured, for example, by a polarizer protecting film (for example, a tri-acetyl cellulose film, a PET film or the like). The fourth film F21c is bonded to the optical display unit face side via a second pressure-sensitive adhesive layer F24. A surface treatment can be applied to the third film F21b. As the surface treatment, for example, there can be listed up a hard coat treatment, a reflection preventing treatment, a treatment aiming at a prevention of a sticking, a diffusion and an anti-glare, and the like. The second release film F22 is provided via the fourth film F21c and the second pressure-sensitive adhesive layer F24. Further, the surface protecting film F23 is provided via the third film F21b and the pressure-sensitive adhesive layer F25.

(8) Feeding Step (S12 in FIG. 1). The second sheet material F2 is unwound from the provided and placed second material roll, and is fed to a downstream side. The second feeder 22 feeding the second sheet material is constructed, for example, by a pair of nip rollers, a tension roller, a rotary drive, an accumulator A, a sensor, a controller and the like.

(9) Second Inspecting Step (S13 in FIG. 1). A defect of the second sheet material F2 is inspected by using a second defect inspection apparatus 24. The defect inspecting method in this case is the same as the method by the first defect inspection apparatus mentioned above.

(10) Second Cutting Step (S14 in FIG. 1). A second cutting apparatus 26 cuts the surface protecting film F23, the pressure-sensitive adhesive layer F25, the second optical film F21 and the second pressure-sensitive adhesive layer F24 into a predetermined size without cutting the second release film F22. Specifically, in correspondence to one of the long side and the short side of the optical display unit, in the case that the width of the second material roll corresponds to the short side, the optical film is cut at the length corresponding to the long side, or in the case that the width of the second material roll corresponds to the long side, the optical film is cut at the length corresponding to the short side. In the present embodiment, as shown in FIG. 3, there is shown an example in which the width of the second material roll (the second sheet material F2) corresponds to the long side of the optical display unit W.

As the cutting portion, for example, there can be listed up a laser, a cutter, the other known cutting portion and the like. The structure is made such as to cut so as to avoid the defect, based on the information of the defect obtained by the second defect inspection apparatus 24. Accordingly, a yield ratio of the second sheet material F2 is widely improved. The second sheet material F2 including the defect is excluded by a second rejection apparatus 29 mentioned below, and is structured such as not to be attached to the optical display unit W.

(11) Second Optical Film Bonding Step (S15 in FIG. 1). Next, after the second cutting step, the second optical film F21 from which the second release film F22 is removed is bonded to a different face from the face to which the first optical film F11 of the optical display unit W1 is bonded, via the second pressure-sensitive adhesive layer F24 by using a second bonding apparatus 28 while removing the second release film F22 by using the second peeling apparatus 27. In this case, there is a case that the optical display unit W1 is rotated at 90 degree by a feed direction switching mechanism of a feed mechanism R before bonding the second optical film F21 to the optical display unit W1, thereby making the first optical film F11 and the second optical film F21 in a relation of crossed nicols.

In other words, in the present invention, it is preferable to include a turning step for turning the optical display unit F11 after being bonded by the first cutting and bonding step in the turning direction in the second cutting and bonding step. In the present invention, it is preferable to carry out the turning step at such an angle that a direction of the long side of the first optical film F11 bonded to the optical display unit W1 after being turned, and a direction of the long side of the second optical film F21 bonded after being cut comes to 0±5 degree, preferably 0±1 degree. For example, in the case that the line direction of the fed first optical film F11 is in parallel to (including on the same line) the line direction of the fed second optical film F21, a turning angle in the turning step is preferably between 85 and 95 degree. At a time of bonding, the second optical film F21 and the optical display unit W1 are executed pressure bonding by being pinched by the rolls.

(12) Inspecting Step of Optical Display Device (S16 in FIG. 1). The inspecting apparatus 30 detects the optical display unit W12 in which the optical film is bonded to both the faces. As an inspecting method, there can be exemplified a method of performing imaging and image processing by the reflected light with respect to both the faces of the optical display unit W12. Further, as the other method, there can be listed up a method of using the polarization film for inspecting placed between the CCD camera and the subject to be inspected. In this case, a known method can be applied to an algorithm of the image processing, and it is possible to detect the defect, for example, by grayscale determination in accordance with a binarization processing.

(13) A non-defective of the optical display unit W12 is determined based on the information of the defect obtained by the inspecting apparatus 30. The optical display unit W12 determined as the non-defective is fed to the next mounting process. In the case that a defective is determined, a reworking process is applied, and the optical film is bonded newly, and is next inspected. In the case that the non-defective is determined, the process gives way to the mounting process, and in the case that the defective is determined, the process again gives way to the reworking process or the defective is put on the shelf.

In a series of production steps mentioned above, it is possible to suitably produce the optical display unit by setting the bonding step of the first optical film F11 and the bonding step of the second optical film F21 to the continuous production line. Particularly, it is possible to bond the optical film to the optical display unit under an environment that a cleanliness is secured, by carrying out each of the steps mentioned above in an inner portion of an isolated equipment which is isolated from the factory, and it is possible to manufacture the optical display unit having a high quality.

(Skip Cut Method)

Further, a description will be given below of the other embodiment of the first cutting step and the second cutting step mentioned above. This embodiment is particularly effective in the case that the first inspection step and the second inspection step mentioned above are not provided. There is a case that the defect information (the defect coordinate, the kind of the defect, the size or the like) of the first and second sheet materials is attached as a code information (for example, a QR code and a bar code) to one end portion in a width direction of the first and second material rolls at a predetermined pitch unit (for example, 1000 mm). In the case mentioned above, the step reads the cord information in a preliminary stage of the cutting, and cuts into a predetermined size in the first and second cutting steps in such a manner as to avoid the defect portion based on the analysis (which may be called as a skip cut). Further, the portion including the defect is structured such as to be removed or be bonded to the other member than the optical display unit, and the piece of sheet material which is cut into the predetermined size and is determined as the non-defective is structured such as to be bonded to the optical display unit. Accordingly, a yield ratio of the optical display unit is widely improved.

(Structure of Whole of Manufacturing System)

Next, a description will be given of a structure of a whole of a manufacturing system in accordance with the present invention. The manufacturing system in accordance with the present invention is a manufacturing system for an optical display device obtained by bonding an optical film having an optical anisotropy to an optical display unit, and is preferably a manufacturing system for an optical display device obtained by bonding an optical film including a polarizing plate to the optical display unit. The manufacturing system in accordance with the present invention is provided with a first cutting and bonding apparatus carrying out a first cutting and bonding step, and a second cutting and bonding apparatus carrying out a second cutting and bonding step.

In the present embodiment, as shown in FIG. 3, there is shown an example which is provided with a feeder M1 of the optical display unit W, a feeder M2 of the first optical film F11, a first bonding apparatus M3 bonding the first optical film F11, a feeder M4 feeding the optical display unit W after being bonded, a feeder M5 of the second optical film F21, and a second bonding apparatus M6 bonding the second optical film F21. In this example, the first cutting and bonding apparatus includes the feeder M2 of the first optical film F11 and the first bonding apparatus M3 bonding the first optical film F11, and the second cutting and bonding apparatus includes the feeder M5 of the second optical film F21 and the second bonding apparatus M6 bonding the second optical film F21.

In the present embodiment, as shown in FIG. 3, there is shown the example in which the feeder M2 of the first optical film F11, the first bonding apparatus M3, the feeder M4, the feeder M5 of the second optical film F21, and the second bonding apparatus M6 are arranged linearly, and the feeder M1 is arranged in such a manner that the optical display unit W is fed from a direction which is vertical to a panel flow direction of the first bonding apparatus M3.

(Structure of Each of Portions of Manufacturing System)

Figure 4:
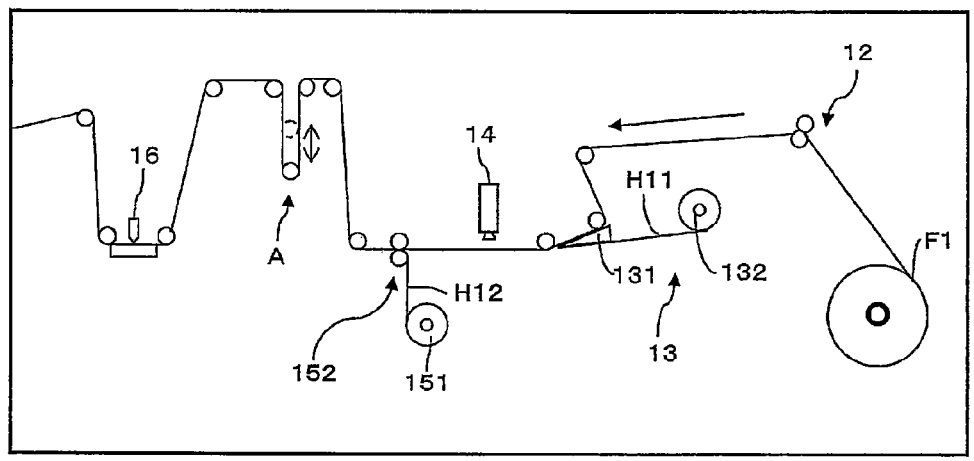
FIG. 4 is a view for explaining a structure of a device of an embodiment of the manufacturing system in accordance with the present invention.

A description will be given below of an example of a structure of each of the portions of the manufacturing system in accordance with the present invention. FIG. 4 is a view showing a first feeder 12, a first pre-inspection peeling apparatus 13, a first defect inspection apparatus 14, a first release film laminating apparatus 15, and a second cutting apparatus 16.

Figure 5:
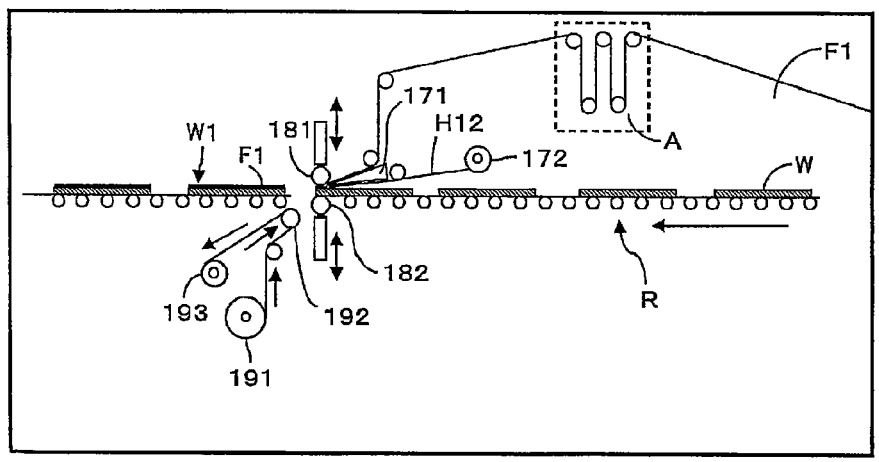
FIG. 5 is a view for explaining a structure of a device of an embodiment of the manufacturing system in accordance with the present invention.
Figure 6:
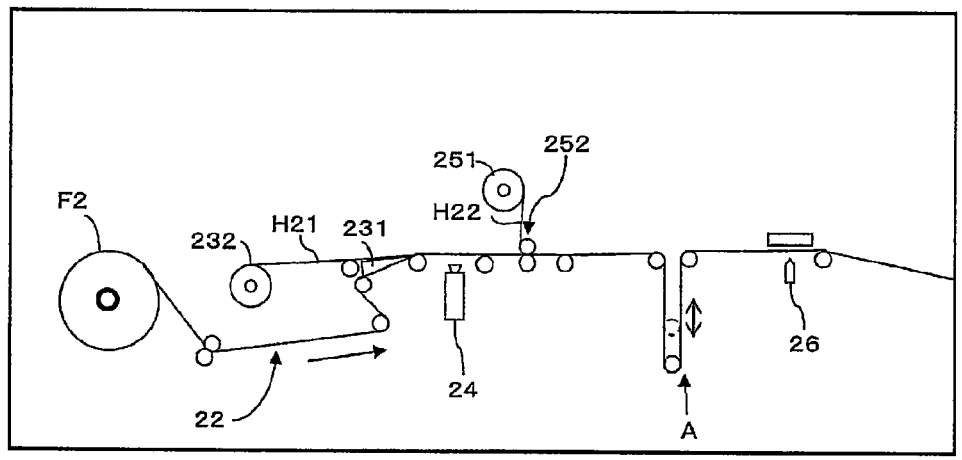
FIG. 6 is a view for explaining a structure of a device of an embodiment of the manufacturing system in accordance with the present invention.
Figure 7:
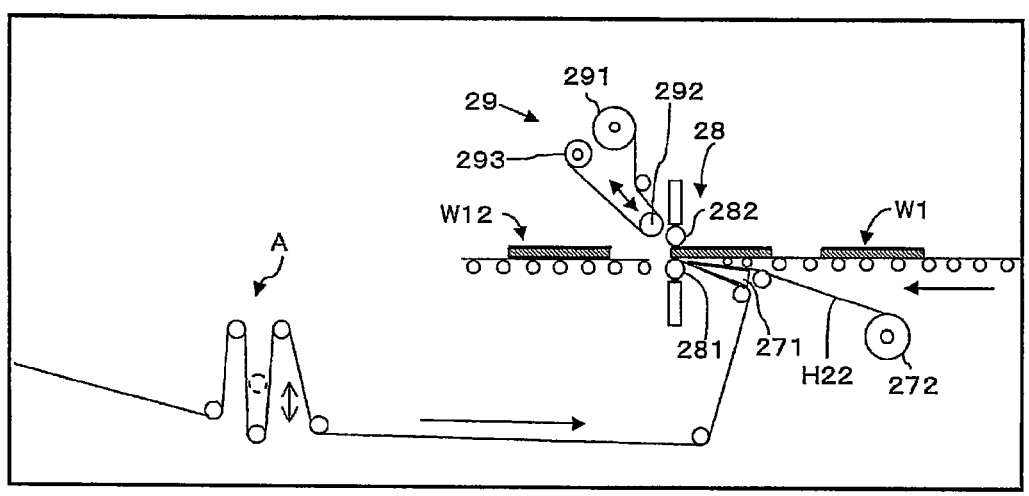
FIG. 7 is a view for explaining a structure of a device of an embodiment of the manufacturing system in accordance with the present invention.

FIG. 5 is a view showing a first peeling apparatus 17, a first bonding apparatus 18 and a first rejection apparatus 19. FIG. 6 is a view showing a second feeder 22, a second pre-inspection peeling apparatus 23, a second defect inspection apparatus 24, a second release film laminating apparatus 25, and a second cutting apparatus 26. FIG. 7 is a view showing a second peeling apparatus 27, a second bonding apparatus 28 and a second rejection apparatus 29.

The manufacturing system in accordance with the present invention is provided with the feeder M1 of the optical display unit feeding the optical display unit W. In the present embodiment, there is shown an example in which the feeder M1 of the optical display unit is provided with the polishing cleaning apparatus 10, the water cleaning apparatus 11, the inspection apparatus D1, and a drying apparatus 113. In the present invention, the feeder M1 of the optical display unit may be constructed only by the feeder mechanism R.

First, a description will be given of a polishing cleaning apparatus 10. The panel W is taken out from the storage box, and is mounted to the feeding mechanism R. If the panel W reaches a cleaning position, the feed is stopped, and an end portion of the panel W is held by a holding portion. A grinding portion is brought into contact with a top face of the panel W from the vertical above, and a grinding portion is brought into contact with a lower face of the panel from the vertical below. The grinding portions are rotated on both the surfaces of the panel W. Accordingly, the attached contaminants on both the surfaces of the panel W are removed. As the attached contaminant, for example, a micro piece of a glass (cullet), a fiber piece and the like are exemplified.

Next, a description will be given of a water cleaning apparatus 11. The grind cleaned panel W is fed to a water bath by the feeding mechanism R, and is water cleaned here. A pure water flows in an inner portion of the water bath. Both faces of the panel W fed from the water bath are rinsed by the pure water flown out of a flowing water pipe.

Next, a description will be given of the inspection apparatus D1. The inspection apparatus D1 includes the feeder R which can support the optical display unit W in a horizontal state, a liquid feeder feeding liquid having a wettability with respect to its surface in such a manner as to come into contact with a whole surface of the optical display unit W so as to make the liquid be held to the surface, and an observation area which can observe a portion at which the liquid is repelled. The liquid feeder serves as a feeder for a rinsing liquid in the cleaning apparatus 11, and in accordance with the inspection apparatus D1, it is possible to carry out the inspection of the optical display unit W in a wet state. In this case, an inspection apparatus which can inspect the optical display unit W in a dry state may be provided. In this case, a similar inspection apparatus to an inspection apparatus mentioned below is provided in a downstream side of a drying apparatus. Further, the inspection apparatus D1 may be omitted.

The liquid fed from the liquid feeder can employ any liquid as far as the liquid has a wettability with respect to the surface of the optical display unit W, however, in the light of utilizing the rinsing cleaning as it is, the water such as pure water, ion exchanged water, distilled water or the like is preferable.

Since the optical display unit W is horizontally supported, the liquid is fed in such a manner as to come into contact with all the surface without any deviation on the basis of a flow of the liquid of the surface. In the observation area, it is possible to observe the optical display unit W while feeding, however, it is possible to do away with a fluctuation of the liquid by once stopping the feeder R so as to carry out the observation, so that it is possible to obtain greater enhancement for the precision of the inspection. In the observation area, it is possible to observe with or without the portion at which the repelling is generated on the basis of a visual observation, and determine whether a non-defective or not on the basis of this, however, it is preferable to automate the detection and the determination.

In the present embodiment, there is shown an example provided with an image information processing apparatus which is provided with a camera imaging the surface of the optical display unit W so as to output an image information in the observation area, and specifies a boundary portion of the portion at which the repelling is generated on the basis of the image information output from the camera, thereby determining with or without the portion. Accordingly, it is possible to automate the detection and the determination of the cleaning defective portion.

It is preferable that an irradiation light is provided above the observation area. In this case, it is preferable that the image information processing apparatus executes a process including a step of specifying the boundary portion by utilizing the image information from a high brightness portion generated by a reflection in the vicinity of the boundary portion between the portion at which the repelling is generated and the other portion.

Next, the panel W is drained by an air blasting of a cleaning air by the drying apparatus. Next, the panel W is fed to the first bonding apparatus 18. In this case, as the other embodiment, ethanol water solution may be used so as to clean in place of the pure water. Further, as the other embodiment, a water bath may be omitted.

The manufacturing system in accordance with the present invention is provided with the feeder M2 of the first optical film which draws out the long sheet material F1 from the roll around which the long sheet material having the first optical film F11 is taken up, and feeds after cutting at the predetermined length. In the present embodiment, there is shown an example in which the feeder M2 of the first optical film is provided with the first feeder 12, the first pre-inspection peeling apparatus 13, the first defect inspection apparatus 14, the first release film laminating apparatus 15, and the first cutting apparatus 16, as shown in FIG. 4. In the present invention, on the basis of the provision of the first pre-inspection peeling apparatus 13, the first defect inspection apparatus 14, and the first release film laminating apparatus 15, it is possible to precisely carry out the inspection of the first optical film, however, these apparatuses can be omitted.

In the present invention, the feeder M2 of the first optical film is structured such as to cut the optical film having the width corresponding to the short side at the length corresponding to the long side, or is structured such as to cut the optical film having the width corresponding to the long side at the length corresponding to the short side, in correspondence to the long side and the short side of the optical display unit. In the present embodiment, there is shown the example in which the feeder M2 of the first optical film cut the optical film having the width corresponding to the short side of the optical display unit at the length corresponding to the long side.

The first material roll of the long first sheet material F1 is installed to a roll mount apparatus working with a motor or the like in such a manner as to rotate free or rotate at a fixed rotating speed. The rotating speed is set by a controller 1 and is drive-controlled.

The first feeder 12 is a feeding mechanism feeding the first sheet material F1 to a downward side. The first feeder 12 is controlled by the controller 1.

The first pre-inspection peeling apparatus 13 is structured such as to peel off the first release film H11 from the fed first sheet material F1, and wind around the roll 132. The winding speed around the roll 132 is controlled by the controller 1. The peeling mechanism 131 is structured such as to have a knife edge portion having a sharp leading end, peel off the first release film H11 by winding the first release film H11 around the knife edge portion so as to reverse transfer, and feed the first sheet material F1 after peeling off the first release film H11 in the feeding direction.

The first inspecting apparatus 14 inspects the defect after peeling off the first release film H11. The first inspecting apparatus 14 analyzes an image data photographed by a CCD camera so as to detect the defect, and calculates a position coordinate thereof. The position coordinate of this defect is provided for the skip cut by the first cutting apparatus 16 mentioned below.

The first release film laminating apparatus 15 laminates a release film H12 to the first optical film F11 via the first pressure-sensitive adhesive layer F14 after the first defect inspection. As shown in FIG. 4, the release film H12 is unwound from the material roll 151 of the release film H12, and the release film H12 and the first optical film F11 are pinched by one or a plurality of roller pairs 152, and are laminated by applying a predetermined pressure by means of the roller pairs 152. A rotating speed, a pressure and a feeding of the roller pairs 152 are controlled by the controller 1.

The first cutting apparatus 16 cuts the first optical film F11, the surface protecting film 15, the first pressure-sensitive adhesive layer F14, and the pressure-sensitive adhesive layer F15 to the predetermined size after bonding the release film H12 without cutting it (the release film H12). The first cutting apparatus 16 is constituted, for example, by a laser. The first cutting apparatus 16 cuts into the predetermined size in such a manner as to avoid the defect portion, based on the position coordinate of the defect detected by the first inspecting step. In other words, the cut article including the defect portion is excluded as the defective by the first rejection apparatus 19 in the later step. Alternatively, the first cutting apparatus 16 may continuously cut into the predetermined size without respect to the existence of the defect. In this case, the structure may be made such as to remove the portion without bonding, in a bonding step mentioned below. The control in this case is based on the function of the controller 1.

Further, the first cutting apparatus 16 arranges a holding table adsorbing and holding the first sheet material F1 from a rear face, and is provided with the laser above the first sheet material F1. It horizontally moves in such a manner as to scan the laser in a width direction of the first sheet material F1, and cuts the first optical film F11, the first pressure-sensitive adhesive layer F14, the surface protecting film F13 and the pressure-sensitive adhesive layer F15 at a predetermined pitch in a feeding direction thereof while leaving the release film H12 in the lowest portion (hereinafter, refer optionally to as "half cut"). Further, it is preferable that the laser is integrally configured by an air nozzle spraying a warm air toward the cut position, and a smoke collecting duct collecting a gas (a smoke) generated from the cut position fed by the warm air, in a state in which they oppose to each other, in such a manner as to pinch from the width direction of the first sheet material F1. In the case of adsorbing the first sheet material F1 by the holding table, an accumulator A of the feeding mechanism is structured such as to move up and down in a vertical direction, so as not to stop the continuous feed of the first sheet material F1 in a downstream side and an upstream side. This motion is based on the control of the controller 1.

The manufacturing system in accordance with the present invention is provided with the first bonding apparatus 18 (M3) bonding the first optical film F11 fed from the feeder M2 of the first optical film to one surface of the optical display unit W fed from the feeder M1 of the optical display unit. In the present embodiment, there is shown an example in which the first bonding apparatus 18 (M3) is constructed by a press roller 181 and a guide roller 182, and a first peeling apparatus 17 and a first rejection apparatus 19 are further provided, as shown in FIG. 5. The first rejection apparatus 19 constructs a rejection mechanism of a defect portion for cutting and rejecting a portion having a defect in the optical film together with the first cutting apparatus 16, however, the rejection mechanism mentioned above can be omitted.

The first bonding apparatus 18 bonds the first sheet material F1 (the first optical film F11) from which the release film H12 is peeled off by the first peeling apparatus 17 to the optical display unit W via the first pressure-sensitive adhesive layer F14, after the cutting step mentioned above. The feed path of the first sheet material F1 is above the feed path of the optical display unit W.

As shown in FIG. 5, in the case of bonding, the first optical film F11 is bonded to the optical display unit W surface while pressure welding by a pressing roller 181 and a guide roller 182. A pressing pressure and a driving motion of the pressing roller 181 and the guide roller 182 are controlled by the controller 1.

The peeling mechanism 171 of the first peeling apparatus 17 is structured such as to have a knife edge portion having a sharp leading end, peel off the release film H12 by winding the release film H12 around the knife edge portion so as to reverse transfer, and feed the first sheet material F1 (the first optical film F11) after peeling off the release film H12 to the optical display unit W surface. The peeled release film H12 is wound around the roll 172. A winding control of the roll 172 is controlled by the controller 1.

In other words, the feeder M2 of the first optical film in the present invention has a feeder mechanism feeding the first optical film F11 to the first bonding apparatus M3 by using the release film formed in the optical film via the pressure-sensitive adhesive layer as the carrying medium.

The bonding mechanism is configured by the pressing roller 181 and the guide roller 182 arranged so as to oppose thereto. The guide roller 182 is configured by a rubber roller which is rotationally driven by a motor, and is arranged so as to be movable up and down. Further, the pressing roller 181 configured by a metal roller which is rotationally driven by a motor is arranged just above the same so as to be movable up and down. The pressing roller 181 is structured such as to be moved up to a higher position than a top face thereof so as to form a roller interval at a time of feeding the optical display unit W to the bonding position. In this case, each of the guide roller 182 and the pressing roller 181 may be configured by the rubber roller or the metal roller. The optical display unit W is cleaned by the various cleaning apparatuses as mentioned above, and is structured such as to be fed by the feeding mechanism R. The feed control of the feeding mechanism R is also controlled by the controller 1.

A description will be given of the first rejection apparatus 19 excluding the first sheet material F1 including the defect. If the first sheet material F1 including the defect is fed to the bonding position, the guide roller 182 moves downward vertically. Next, the roller 192 around which the adhesive tape 191 is wound moves to a fixed position of the guide roller 182. The first sheet material F1 including the defect is pressed to the adhesive tape 191 by moving the pressing roller 181 downward vertically, the first sheet material F1 is bonded to the adhesive tape 191, and the first sheet material F1 including the defect is wound around the roller 193 together with the adhesive tape 191.

The optical display unit W1 manufactured as mentioned above is fed to a downstream side, and the second optical film F21 (the second sheet material F2) is bonded thereto. In the following description, a similar apparatus structure will be briefly described.

The manufacturing system in accordance with the present invention is provided with the feeder M4 feeding the optical display unit W after the first optical film F11 is bonded, however, it is preferable that the feeder M4 has a turning mechanism 20 turning the optical display unit W after being bonded by the first bonding apparatus 18 in a bonding direction in the second bonding apparatus 28.

For example, in the case that the second optical film F21 is bonded to the first optical film F11 in a relation of 90 degree (a relation of crossed nicols), the second optical film F21 is bonded after rotating the optical display unit W1 at 90 degree by a feed direction switching mechanism (turning mechanism 20) of the feeding mechanism R. In the bonding method of the second sheet material F2 described below, the structure is made such as to process each of the steps in a state in which the second sheet material F2 is reversed (in such a manner that the release film comes to a top face), and bond the second optical film F21 from a lower side of the optical display unit W1.

The manufacturing system in accordance with the present invention is provided with the feeder M5 of the second optical film which draws out the long sheet material F2 from the roll around which the long sheet material having the second optical film F21 is taken up, and feeds after cutting at a predetermined length. In the present embodiment, there is shown an example in which the feeder M5 of the second optical film is provided with the second feeder 22, the second pre-inspection peeling apparatus 23, the second defect inspection apparatus 24, the second release film laminating apparatus 25, and the second cutting apparatus 26, as shown in FIG. 6. In the present invention, on the basis of the provision of the second pre-inspection peeling apparatus 23, the second defect inspection apparatus 24, and the second release film laminating apparatus 25, it is possible to precisely inspect the second optical film, however, these apparatuses can be omitted.

In the present invention, the feeder M5 of the second optical film is structured such as to cut the optical film having the width corresponding the short side at the length corresponding to the long side, or is structured such as to cut the optical film having the width corresponding to the long side at the length corresponding to the short side, in correspondence to the long side and the short side of the optical display unit W. In the present embodiment, there is shown an example in which the feeder M5 of the second optical film is structured such as to cut the optical film F21 having the width corresponding to the long side of the optical display unit W at the length corresponding to the short side.

As shown in FIG. 6, the second material roll of the long second sheet material F2 is installed to the roll mount apparatus working with the motor or the like in such a manner as to rotate free or rotate at a fixed rotating speed. The rotating speed is set by the controller 1, and is drive-controlled.

The second feeder 22 is a feeding mechanism feeding the second sheet material F2 to a downward side. The second feeder 22 is controlled by the controller 1.

The second pre-inspection peeling apparatus 23 is structured such as to peel off a release film H21 from the fed second sheet material F2 so as to wind around the roll 232. A winding speed around the roll 232 is controlled by the controller 1. The peeling mechanism 231 is structured such as to have a knife edge portion having a sharp leading end, peel off the release film H21 by winding the release film H21 around the knife edge portion so as to reverse transfer, and feed the second sheet material F2 after peeling off the release film H21 in the feeding direction.

The second inspecting apparatus 24 inspects the defect after peeling off the release film H21. The second inspecting apparatus 24 analyzes the image data photographed by the CCD camera so as to detect the defect, and calculates a position coordinate thereof. The position coordinate of this defect is provided for the skip cut by the second cutting apparatus 26 mentioned below.

The manufacturing system in accordance with the present invention is provided with the second bonding apparatus 28 (M6) bonding the second optical film F21 fed from the feeder M5 of the second optical film to the other surface of the optical display unit W fed from the feeder M4. In the present embodiment, there is shown an example in which the second bonding apparatus 28 (M6) is constructed by the press roller 281 and the guide roller 282 and is further provided with the second peeling apparatus 27 and the second rejection apparatus 29, as shown in FIG. 7. The second rejection apparatus 29 constructs a rejection mechanism of a defect portion for cutting and rejecting the portion having the defect in the optical film together with the second cutting apparatus 26, however, the rejection mechanism mentioned above may be omitted.

The second release film laminating apparatus 25 laminates the release film H22 to the second optical film F21 via the second pressure-sensitive adhesive layer F24 after the second defect inspection. As shown in FIG. 6, the release film H22 is unwound from the material roll 251 of the release film H22, and the release film H22 and the second optical film F21 are pinched by one or a plurality of roller pairs 252, and are laminated by applying a predetermined pressure by means of the roller pairs 252. A rotating speed, a pressure and a feeding of the roller pairs 252 are controlled by the controller 1.

The second cutting apparatus 26 cuts the second optical film F21, the surface protecting film 25, the second pressure-sensitive adhesive layer F24 and the pressure-sensitive adhesive layer F25 into a predetermined size without cutting the release film H22 after laminating the release film H22. The second cutting apparatus 26 is constituted, for example, by a laser. The second cutting apparatus 26 cuts into the predetermined size in such a manner as to avoid the defect portion, based on the position coordinate of the defect detected by the second inspecting step. In other words, the cut article including the defect portion is excluded as the defective by the second rejection apparatus 29 in the later step. Alternatively, the second cutting apparatus 26 may continuously cut into the predetermined size without respect to the existence of the defect. In this case, the structure may be made such as to remove the portion without bonding, in a bonding step mentioned below. The control in this case is based on the function of the controller 1.

Further, the second cutting apparatus 26 arranges a holding table adsorbing and holding the second sheet material F2 from a rear face, and is provided with the laser below the second sheet material F2. It horizontally moves in such a manner as to scan the laser in a width direction of the second sheet material F2, and cuts the second optical film F21, the second pressure-sensitive adhesive layer F24, the surface protecting film F23 and the pressure-sensitive adhesive layer F25 at a predetermined pitch in a feeding direction thereof while leaving the release film H22 in the lowest portion. In the case of adsorbing the second sheet material F2 by the holding table, an accumulator A of the feeding mechanism is structured such as to move up and down in a vertical direction, so as not to stop the continuous feed of the second sheet material F2 in a downstream side and an upstream side. This motion is based on the control of the controller 1.

The second bonding apparatus 28 bonds the second sheet material F2 (the second optical film F21) from which the release film H22 is peeled off by the second peeling apparatus 27 to the optical display unit W1 via the second pressure-sensitive adhesive layer F24, after the cutting step. As shown in FIG. 7, in the case of bonding, the second optical film F21 is bonded to the optical display unit W1 surface while pressure welding by a pressing roller 281 and a guide roller 282. A pressing pressure and a driving motion of the pressing roller 281 and the guide roller 282 are controlled by the controller 1.

The peeling mechanism 271 of the second peeling apparatus 27 is structured such as to have a knife edge portion having a sharp leading end, peel off the release film H22 by winding the release film H22 around the knife edge portion so as to reverse transfer, and feed the second sheet material F2 (the second optical film) after peeling off the release film H22 to the optical display unit W1 surface. The peeled release film H22 is wound around the roll 272. A winding control of the roll 272 is controlled by the controller 1.

In other words, the feeder M5 of the second optical film in the present invention has a feeder mechanism feeding the second optical film F21 to the second bonding apparatus M6 by using the release film formed in the optical film via the pressure-sensitive adhesive layer as the carrying medium.

The bonding mechanism is configured by the pressing roller 281 and the guide roller 282 arranged so as to oppose thereto. The guide roller 282 is configured by a rubber roller which is rotationally driven by a motor, and is arranged so as to be movable up and down. Further, the pressing roller 281 configured by a metal roller which is rotationally driven by a motor is arranged just below the same so as to be movable up and down. The pressing roller 281 is structured such as to be moved down to a below position so as to form a roller interval at a time of feeding the optical display unit W1 to the bonding position. In this case, each of the guide roller 282 and the pressing roller 281 may be configured by the rubber roller or the metal roller.

A description will be given of the second rejection apparatus 29 excluding the second sheet material F2 including the defect. If the second sheet material F2 including the defect is fed to the bonding position, the guide roller 282 moves upward vertically. Next, the roller 292 around which the adhesive tape 291 is wound moves to a fixed position of the guide roller 282. The second sheet material F2 including the defect is pressed to the adhesive tape 291 by moving the pressing roller 281 upward vertically, the second sheet material F2 is bonded to the adhesive tape 291, and the second sheet material F2 including the defect is wound around the roller 293 together with the adhesive tape 291.

The optical display unit W12 to which the first and second sheet materials are bonded is fed to the inspection apparatus 30. The inspecting apparatus 30 executes the inspection with respect to both faces of the fed optical display unit W12. The light source emits light vertically to the top face of the optical display unit W12 by a half mirror, and a reflected light image is photographed as an image data by a CCD camera. The light source and the CCD camera execute an inspection of an opposed surface thereto. Further, the light source irradiates the surface of the optical display unit W12 at a predetermined angle, and images a reflected light image as an image data by the CCD camera. The light source and the CCD camera execute the inspection of the opposed surface. The defect is image processed and analyzed from the image data, and a non-defective is determined.

An operation timing of each of the apparatuses is calculated, for example, by a method that a sensor is arranged at a predetermined position so as to detect, or is calculated in such a manner as to detect a rotating member of the feeder and the feeding mechanism R by a rotary encoder or the like. The controller 1 may be achieved by a cooperating action between a software program and a hardware resource such as a CPU, a memory or the like. In this case, the program software, a processing procedure, various settings and the like are previously stored in the memory. Further, it can be configured by a dedicated circuit, a firmware or the like.

The optical film in accordance with the present invention can be preferably used for forming an image display device (corresponding to an optical display device) such as a liquid crystal display device, an organic electroluminescent (EL) display device, a plasma display panel (PDP) and the like.

The optical film in accordance with the present invention can be preferably used for forming various devices such as the liquid crystal display device and the like. The liquid crystal display device can be formed in accordance with the conventional way. In other words, the liquid crystal display device is generally formed by appropriately assembling component parts such as a liquid crystal cell (corresponding to the optical display unit), an optical film and a lighting system as occasion demands and installing a driving circuit, however, the forming way is not particularly limited in the present invention except a point that the optical film is used, and can be based on the conventional way. With regard to the liquid crystal cell, it is possible to use an optional type, for example, TN type, STN type, π type and the like.

It is possible to form an appropriate liquid crystal display device such as a liquid crystal display device in which the optical film is arranged in one side or both sides of the liquid crystal cell, one in which a backlight or a reflector is used in the lighting system, and the like. In this case, the optical film in accordance with the present invention can be placed in one side or both sides of the liquid crystal cell. In the case that the optical film is provided in both sides, they may be the same or may be different. Further, at a time of forming the liquid crystal display device, it is possible to arrange appropriate parts, for example, a diffusion plate, an anti-glare layer, an anti-reflection film, a protective plate, a prism array, a lens array sheet, a light diffusion plate, a backlight and the like at appropriate positions in one layer or two layers or more.

The optical film in accordance with the present invention can be preferably used for forming various devices such as the liquid crystal display device and the like. The liquid crystal display device can be formed as a device having an appropriate structure based on conventional transmitting type, reflecting type or transmitting and reflecting both-way type in which the optical film in accordance with the present invention is arranged in one side or both sides of the liquid crystal cell. Accordingly, the liquid crystal cell forming the liquid crystal display device is optional, for example, it is possible to use an appropriate type of liquid crystal cell such as an simple matrix drive type represented by a thin film transistor type.

Further, in the case that the polarizing plate or the optical member is provided in both sides of the liquid crystal cell, they may be the same or may be different. Further, at a time of forming the liquid crystal display device, it is possible to arrange appropriate parts, for example, a prism array sheet, a lens array sheet, a light diffusion plate, a backlight and the like at appropriate positions in one layer or two layers or more.

(Other Embodiment of Manufacturing System)

Any arrangement may be employed for an arrangement of each of the apparatuses of the manufacturing system in accordance with the present invention, for example, the feeder M1 of the optical display unit W, the feeder M2 of the first optical film F11, and the first bonding apparatus M3 may be arranged linearly, the feeder M5 of the second optical film F21 and the second bonding apparatus M6 may be arranged in parallel thereto, and the feeder M4 may be arranged so as to be provided between the first bonding apparatus M3 and the second bonding apparatus M6.

In this case, in the present invention, in the case that the turning mechanism of the optical display unit W is not provided, it is preferable that the feeder M2 of the first optical film F11 and the first bonding apparatus M3 are arranged vertically to the feeder M5 of the second optical film F21 and the second bonding apparatus M6.

The invention claimed is:

1. A manufacturing system for an optical display device obtained by bonding an optical film having the optical anisotropy to an optical display unit, comprising:
   a first cutting and bonding apparatus cutting a first optical film at a length corresponding to a long side of said optical display unit and thereafter bonding to one surface of the optical display unit, by using a roll around which a long sheet material having the first optical film having a width corresponding to a short side of said optical display unit is taken up;
   a second cutting and bonding apparatus cutting a second optical film at a length corresponding to a short side of said optical display unit and thereafter bonding to the other surface of the optical display unit, by using a roll around which a long sheet material having the second optical film having a width corresponding to a long side of said optical display unit is taken up; and
   a turning mechanism to turn the optical display unit after being bonded by said first cutting and bonding apparatus in a bonding direction in said second cutting and bonding apparatus or to turn the optical display unit after being bonded by said second cutting and bonding apparatus in a bonding direction in said first cutting and bonding apparatus.

2. A manufacturing method for an optical display device obtained by bonding an optical film having the optical anisotropy to an optical display unit, comprising:
   a first cutting and bonding step of cutting a first optical film at a length corresponding to a long side of said optical display unit and thereafter bonding to one surface of the optical display unit, by using a roll around which a long sheet material having the first optical film having a width corresponding to a short side of said optical display unit is taken up; and
   a second cutting and bonding step of cutting a second optical film at a length corresponding to a short side of said optical display unit and thereafter bonding to the other surface of the optical display unit, by using a roll around which a long sheet material having the second optical film having a width corresponding to a long side of said optical display unit is taken up; and a turning step of turning the optical display unit after being bonded by said first cutting and bonding step in a bonding direction in said second cutting and bonding step or of turning the optical display unit after being bonded by said second cutting and bonding step in a bonding direction in said first cutting and bonding step.

3. A manufacturing method for an optical display device obtained by bonding an optical film including a polarizing plate to an optical display unit, comprising:

a first cutting and bonding step of drawing out a long sheet material from a roll around which the long sheet material having a first optical film is taken up so as to cut at a predetermined length, and thereafter bonding the first optical film to one surface of said optical display unit while feeding;

a second cutting and bonding step of drawing out a long sheet material from a roll around which the long sheet material having a second optical film is taken up so as to cut at a predetermined length, and thereafter bonding the second optical film to the other surface of said optical display unit while feeding;

wherein the method comprises a step of cutting the optical film having the width corresponding to a short side of said optical display unit at a length corresponding to a long side thereof at a time of feeding one of said first optical film and said second optical film, and cutting the optical film having the width corresponding to the long side at a length corresponding to the short side at a time of feeding the other of them, in correspondence to the long side and the short side of said optical display unit, at a time of feeding said first optical film and said second optical film; and further comprising a turning step of turning the optical display unit after being bonded by said first cutting and bonding step in a bonding direction in said second cutting and bonding step.

4. A manufacturing method for an optical display device as claimed in claim 3, further comprising a rejection step of a defect portion for cutting and rejecting a portion having a defect in the optical film, at a time of feeding said first optical film and said second optical film.

5. A manufacturing method for an optical display device as claimed in any one of claims 3 and 4, wherein the method feeds the first optical film to the first cutting and bonding step and the second optical film to the second cutting and bonding step by using a release film formed in the optical film via a pressure-sensitive adhesive layer as a carrying medium, at a time of feeding said first optical film and said second optical film.

* * * * *